US006715562B1

(12) United States Patent
Chen

(10) Patent No.: US 6,715,562 B1
(45) Date of Patent: Apr. 6, 2004

(54) OUTPUT SHAFT LOCKING DEVICE

(75) Inventor: Ting-Kuang Chen, Keelung (TW)

(73) Assignee: Power Network Industry, Co., Ltd., Taoyuan (TW)

( * ) Notice: Subject to any disclaimer, the term of this patent is extended or adjusted under 35 U.S.C. 154(b) by 0 days.

(21) Appl. No.: 10/434,766

(22) Filed: May 8, 2003

(51) Int. Cl.[7] .................................................. B23Q 5/00

(52) U.S. Cl. ........................ 173/93.5; 173/93; 173/176; 173/216; 192/223; 192/54.5

(58) Field of Search ......................... 173/93, 93.5, 216, 173/176, 178, 104; 192/37, 43.1, 45.1, 54.5, 223; 74/625; 81/476

(56) References Cited

U.S. PATENT DOCUMENTS 3,587,796 A * 6/1971 Nestvogel ................... 192/223
4,466,523 A * 8/1984 De Carolis et al. ........ 192/43.1
4,645,050 A * 2/1987 Ingenhoven ................. 192/36
5,083,619 A * 1/1992 Giardino et al. .............. 173/93
5,915,484 A * 6/1999 Hsieh ......................... 173/176
6,035,947 A 3/2000 Chung ....................... 173/93.5
6,209,659 B1 * 4/2001 Blessing ..................... 173/201
6,311,787 B1 * 11/2001 Berry et al. ................ 173/176
6,338,404 B1 1/2002 Chen .......................... 192/223
6,360,828 B1 3/2002 Chung ....................... 173/93.5
6,454,020 B1 9/2002 Jong ........................... 173/93

* cited by examiner

*Primary Examiner*—Scott A. Smith

(57) ABSTRACT

An output shaft locking device includes a hollow frame through which an output shaft extends. The output shaft has a polygonal end which is connected to a driving device. A locking device includes a fixed ring received in an underside of the hollow frame and an inner ring is rotatably received in the fixed ring. A first polygonal hole is defined through the inner ring and recesses are defined in an underside of the inner ring. The driving device has a driving disk and a second polygonal hole is defined through the driving disk so that the polygonal end of the output shaft engages the two polygonal holes. A plurality of protrusions is formed on a top of the driving disk and matches the recesses in the underside of the inner ring. Gaps are defined between the polygonal end and the two polygonal holes. When the driving device does not provide power to the output shaft, the output shaft is locked by the locking device.

3 Claims, 8 Drawing Sheets

OUTPUT SHAFT LOCKING DEVICE

FIELD OF THE INVENTION

The present invention relates to a locking device for locking an output shaft when the machine has no torque output while an external force is applied to the output shaft.

BACKGROUND OF THE INVENTION

Conventional electric machines, such as electric drills, screwdrivers, lathe and millers, comprise an output shaft coupled to a driving device that transfers power to the output shaft. A tool is mounted to the output shaft for being driven thereby. A clutch device is usually arranged between the output shaft and the driving device for selectively coupling the output shaft to the driving device to transfer the power of the driving device to the output shaft. On the contrary, when the clutch device disengages, the power from the driving device cannot be transferred to the output shaft. To remove the tool from the output shaft, a chuck or similar device must be employed to lock the output shaft. In other words, an operator has to operate an additional chuck to hold the output shaft. In case that the output shaft is not locked, the driving device may get damaged by an external force applied to the output shaft, which is transferred through the clutch device, if the clutch device is not set at a disengagement position.

The present invention intends to provide an output shaft locking device that locks the output shaft to prevent an external force applied thereto from being transferred to the driving device without the application of a chuck.

SUMMARY OF THE INVENTION

In accordance with one aspect of the present invention, there is provided an output shaft locking device which comprises a hollow frame having an output shaft extending therethrough wherein the output shaft has a polygonal end for coupling to a driving device.

A locking device comprises a fixed ring mounted to an underside of the hollow frame. An inner ring is rotatably received in the fixed ring. A first polygonal hole is defined through the inner ring and recesses are defined in an underside of the inner ring.

The driving device has a driving disk. A second polygonal hole is defined through the driving disk. A plurality of protrusions is formed on one end of the driving disk and matches with the recesses in the underside of the inner ring. The polygonal end of the output shaft engages with the first polygonal hole and the second polygonal hole. Gaps are respectively defined between two sides of each of the protrusions of the driving disk and the recesses in the inner ring, and defined between the two sides of the polygonal end of the output shaft and the first polygonal hole in the inner ring. Two gaps are respectively defined between two sides of the polygonal end of the output shaft and the second polygonal hole in the driving disk. The output shaft is locked when the driving disk is not rotated by the locking device, which allows an operator to remove a tool that is coupled to the output shaft without fixing the output shaft with a chuck.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
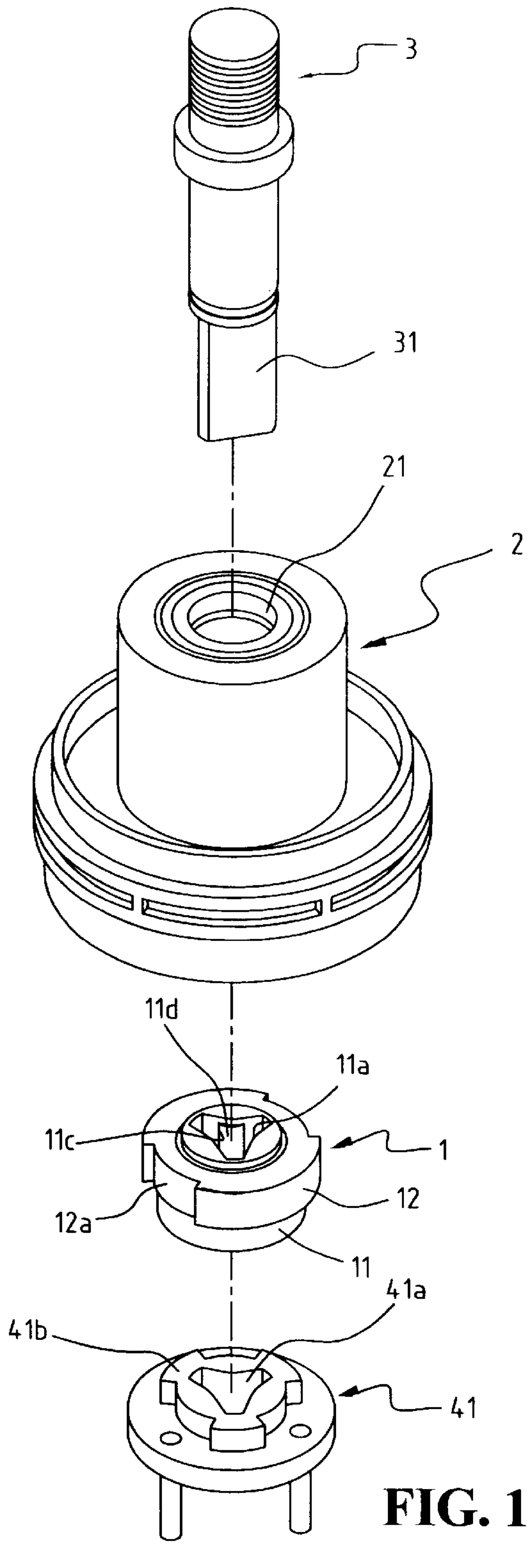
FIG. 1 is an exploded view showing a locking device, an output shaft and a driving disk of an electric machine tool in accordance with the present invention.
Figure 2:
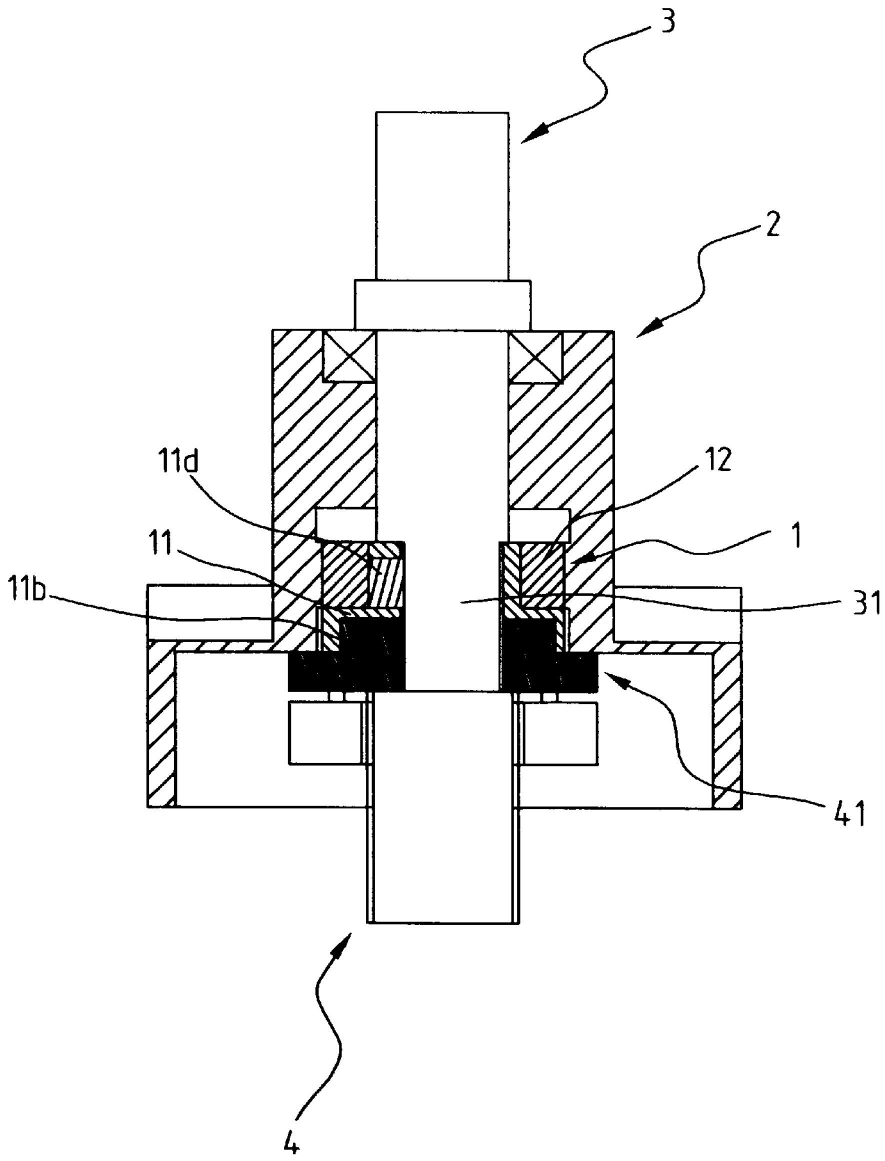
FIG. 2 is a cross-sectional view showing an assembly of the locking device, the output shaft and the driving disk of the present invention.
Figure 3:
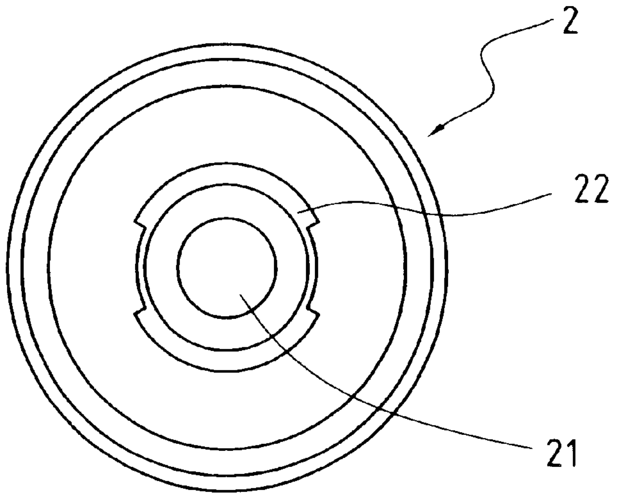
FIG. 3 is a plan view of the locking device of the present invention.
Figure 4:
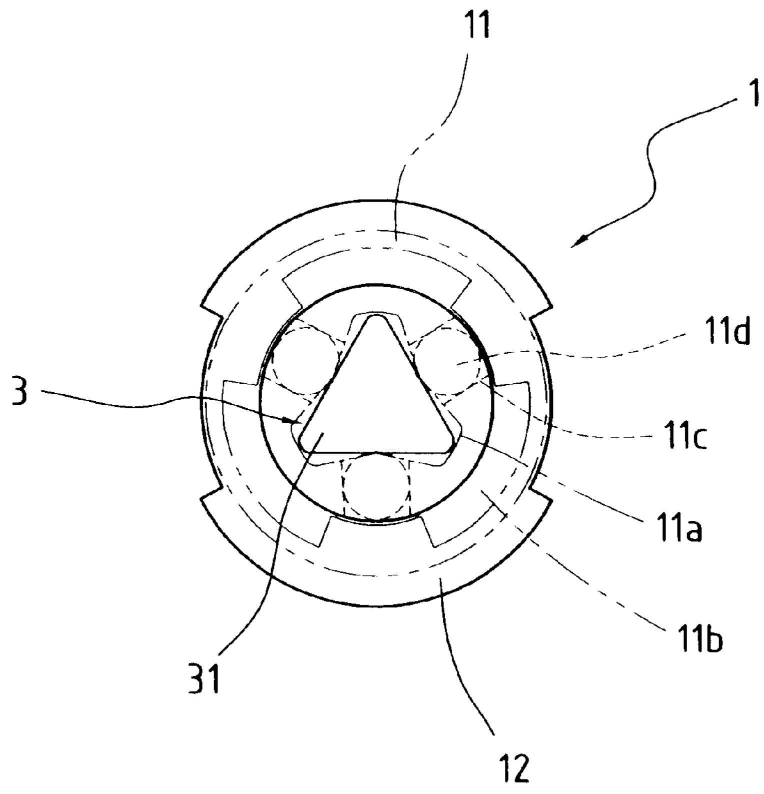
FIG. 4 shows a polygonal end of the output shaft engaging a polygonal hole defined in the inner ring.

Referring to FIGS. 1–4, an output shaft locking device in accordance with the present invention comprises a hollow frame 2 having a passage 21 defined longitudinally therethrough and an output shaft 3 rotatably extending through the passage 21. The output shaft 3 has a polygonal end 31 that has a triangular cross section in the embodiment illustrated and is connected to a driving device 4.

A locking device 1 comprises a fixed ring 12 received in a chamber 22 defined in an underside of the hollow frame 2 and an inner ring 11 rotatably received in the fixed ring 12. A first polygonal hole 11*a* is defined through the inner ring 11. Three projections extend from an inner periphery of an underside of the inner ring 11 so as to form three recesses 11*b*. A side hole 11*c* is defined in each side wall of the first polygonal hole 11*a* and a column 11*d* engages each of the side holes 11*c*.

Figure 5:
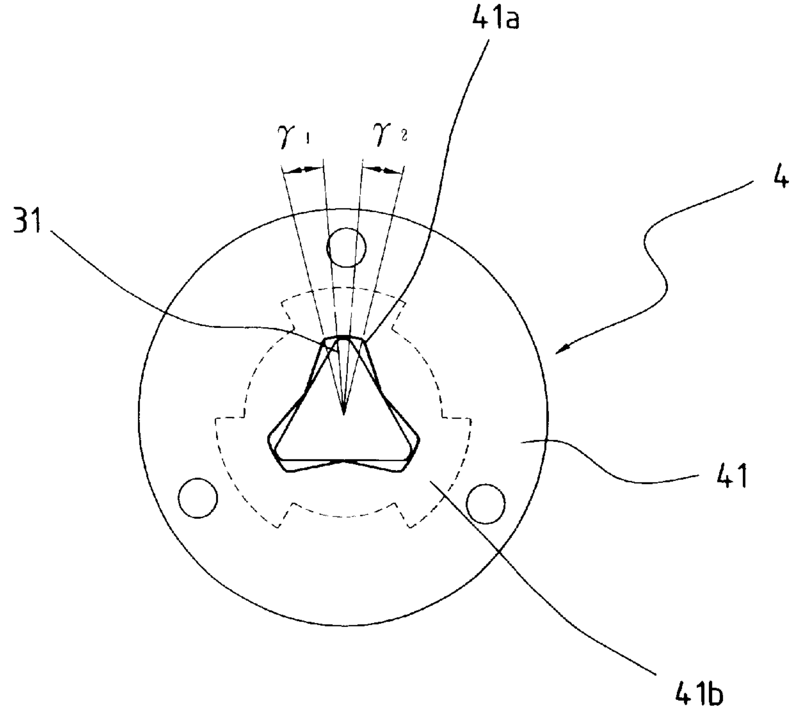
FIG. 5 shows angles between two sides of the polygonal end of the output shaft and the polygonal hole in the driving disk.
Figure 6:
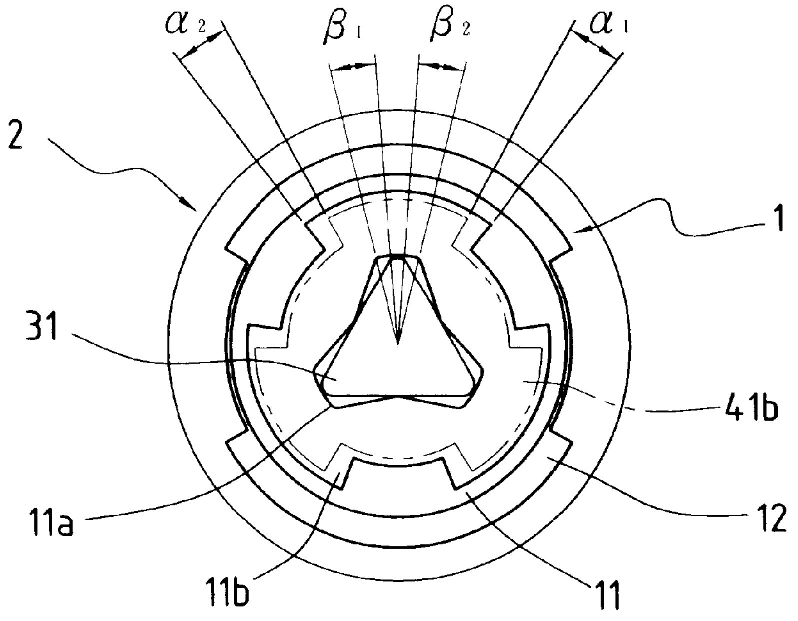
FIG. 6 shows angles $\alpha 1$ and $\alpha 2$ between two sides of each protrusion of the driving disk and the corresponding recess defined in the inner ring, and angles $\beta 1$ and $\beta 2$ respectively defined between two sides of the polygonal end of the output shaft and the first polygonal hole in the inner ring.

Further referring to FIGS. 5 and 6, the driving device 4 is connected to a power source on one end of a driving disk 41. A second polygonal hole 41*a* is defined through the driving disk 4. A plurality of protrusions 41*b* is located on the other end of the driving disk 41 and matches with the recesses in the underside of the inner ring 11. The polygonal end 31 of the output shaft 3 engages the first polygonal hole 11*a* and the second polygonal hole 41*a*.

Two first angles $\alpha 1$ and $\alpha 2$ are respectively defined between two sides of each protrusion 41*b* of the driving disk 41 and the corresponding recess 11*b* in the inner ring 11. Two second angles $\beta 1$ and $\beta 2$ are respectively defined between two sides of the polygonal end 31 of the output shaft 3 and the first polygonal hole 11*a* in the inner ring 11. Two second angles $\gamma 1$ and $\gamma 2$ are respectively defined between two sides of the polygonal end 31 of the output shaft 3 and the second polygonal hole 41*a* in the driving disk 41. The relationship between these angles are: $\alpha i=\beta i$ or $\alpha i=\gamma i$, wherein i=1 or 2. When $\alpha i=0$ and $\gamma i=0$, $\beta i$ is not zero.

Figure 7A:
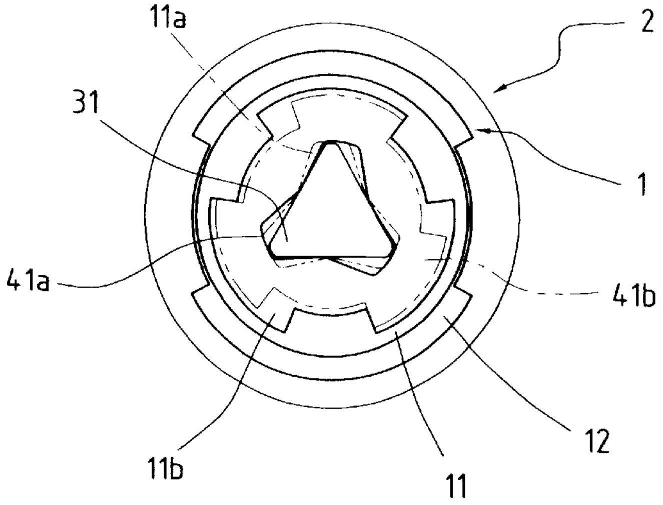
FIGS. 7*a* and 7*b* show the locking device and the output shaft when the driving disk outputs power.
Figure 7B:
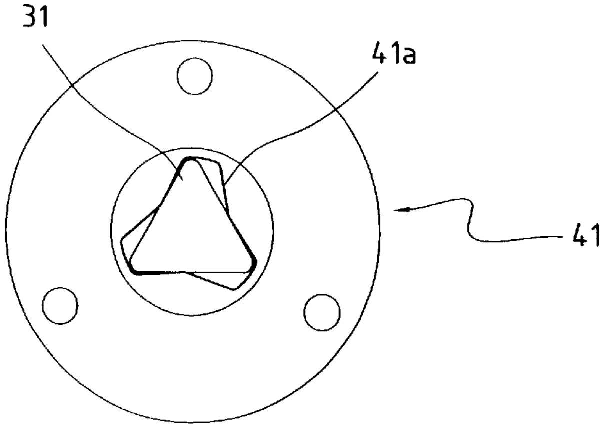

Referring to FIGS. 7*a* and 7*b*, when power is transferred to the driving disk 41 in a clockwise direction, the right side of the protrusion 41*b* contacts the right side of the recess 11*b*, and the left side of the second polygonal hole 41 contacts the left side of the polygonal end 31. In the meanwhile, $\alpha 1=\gamma 2=0$ and $\beta 1$ and $\beta 2$ are not zero. Therefore, the polygonal end 31 does not push the columns 11*d*, which do not push the inner periphery of the fixed ring 12 so that the inner ring 11 is rotatable relative to the fixed ring 12, the output shaft is not locked. Similarly, when the power is transferred in a counterclockwise direction, the output shaft 3 is not locked either.

Figure 8A:
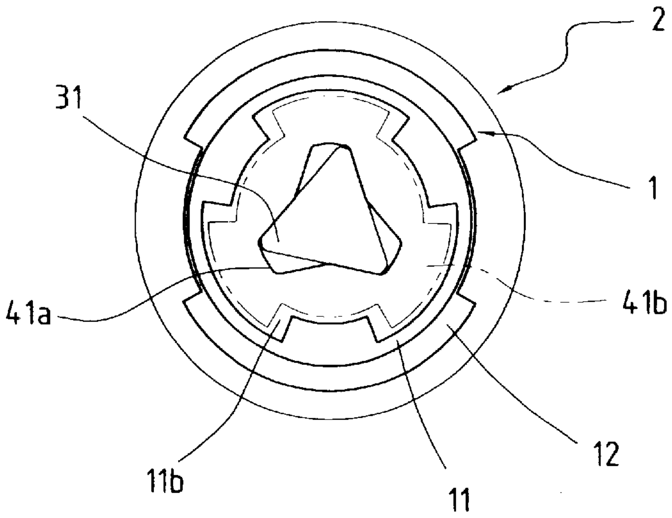
FIGS. 8*a* and 8*b* show the locking device and the output shaft that is subject to a reaction torque.
Figure 8B:
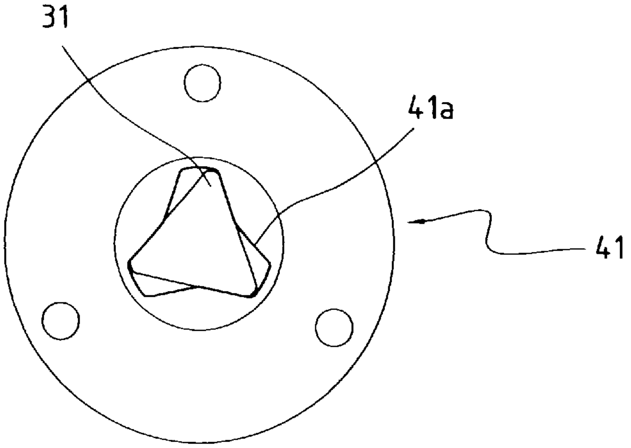

Referring to FIGS. 8*a* and 8*b*, when the driving device 4 transfers no power and the output shaft 3 is subject to a clockwise external torque, which drives the driving disk 41 and the right side of the polygonal end 31 of the output shaft 3 contacts the right side of the first polygonal hole 11*a*. This makes the value of the angle β2 become zero. Therefore, the polygonal end 31 presses the columns 11*d* in the inner ring 11 and the columns 11*d* press the inner periphery of the fixed ring 12. The inner ring 11 is not rotatable relative to the fixed ring 12 so that the output shaft 3 is locked and cannot rotate. Similarly, when the torque applied to the output shaft 3 is counterclockwise, the output shaft 3 is locked also.

The locking device can be used on millers, drills or portable electric tools. When power is transferred to the output shaft 3, the output shaft 3 is not locked. When no power is transferred to the output shaft 3, the output shaft 3 is locked so that the user may remove the tools or bits from the output shaft 3.

While we have shown and described the embodiment in accordance with the present invention, it should be clear to those skilled in the art that further embodiments may be made without departing from the scope of the present invention.

What is claimed is:

1. An output shaft locking device comprising:

a hollow frame having an output shaft extending therethrough, the output shaft having a polygonal end which is connected to a driving device;

a fixed ring mounted to an underside of the hollow frame;

an inner ring rotatably received in the fixed ring, a first polygonal hole defined through the inner ring and recesses defined in an underside of the inner ring, a side hole defined in each one of insides of the first polygonal hole and a column engaging each of the side holes;

a driving disk through which a second polygonal hole is defined, a plurality of protrusions located on one end of the driving disk and matched with the recesses in the underside of the inner ring;

the polygonal end of the output shaft engaging the first polygonal hole and the second polygonal hole;

two first angles α1 and α2 respectively defined between two sides of each of the protrusions of the driving disk and the recesses in the inner ring;

two second angles β1 and β2 respectively defined between two sides of the polygonal end of the output shaft and the first polygonal hole in the inner ring;

two second angles γ1 and γ2 respectively defined between two sides of the polygonal end of the output shaft and the second polygonal hole in the driving disk, and αi=βi and αi=γi, i=1 or 2.

2. The device as claimed in claim 1, wherein the polygonal end of the output shaft has a triangular cross section.

3. The device as claimed in claim 1, wherein a number of the recesses in the inner ring and a number of the protrusions driving disk are both three.

* * * * *